(12) United States Patent
Seki

(10) Patent No.: US 6,913,529 B2
(45) Date of Patent: Jul. 5, 2005

(54) AIR PASSAGE SWITCHING DEVICE AND VEHICLE AIR CONDITIONER USING THE SAME

(75) Inventor: Hideki Seki, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/830,050

(22) Filed: Apr. 22, 2004

(65) Prior Publication Data

US 2004/0211552 A1 Oct. 28, 2004

(30) Foreign Application Priority Data

Apr. 25, 2003 (JP) ........................................ 2003-122281

(51) Int. Cl.[7] ................................................ B60H 1/00
(52) U.S. Cl. ........................................ 454/121; 165/43
(58) Field of Search .......................... 454/121; 165/204, 165/42, 43

(56) References Cited

U.S. PATENT DOCUMENTS 5,699,851 A * 12/1997 Saida et al. .................... 165/42
5,899,806 A    5/1999 Hase et al.
6,032,723 A *  3/2000 Tsuihiji et al. ................ 165/42
6,685,554 B2 *  2/2004 Abouchaar ................... 454/121
2004/0093884 A1 *  5/2004 Seki et al. ..................... 62/244

FOREIGN PATENT DOCUMENTS

JP            5-58143           3/1993

* cited by examiner

*Primary Examiner*—Harold Joyce
(74) *Attorney, Agent, or Firm*—Harness, Dickey & Pierce, PLC

(57) ABSTRACT

An air passage switching device for a vehicle air conditioner includes first and second openings and a rotary door for opening and closing the first and second openings. A rib having a first middle seal surface and a rib having a second middle seal surface are provided in a case to protrude an inner side and to be separated by a predetermined angle in a rotation direction of the rotary door. Further, the rotary door has a door structure angle that is larger than a door operating angle. In addition, the first and second middle seal surfaces and first and second end seal surfaces are provided in the case so that the predetermined angle is a difference between the door structure angle and the door operating angle. Accordingly, arrangement positions of the first and second openings can be readily set without increasing a door operating amount.

15 Claims, 9 Drawing Sheets

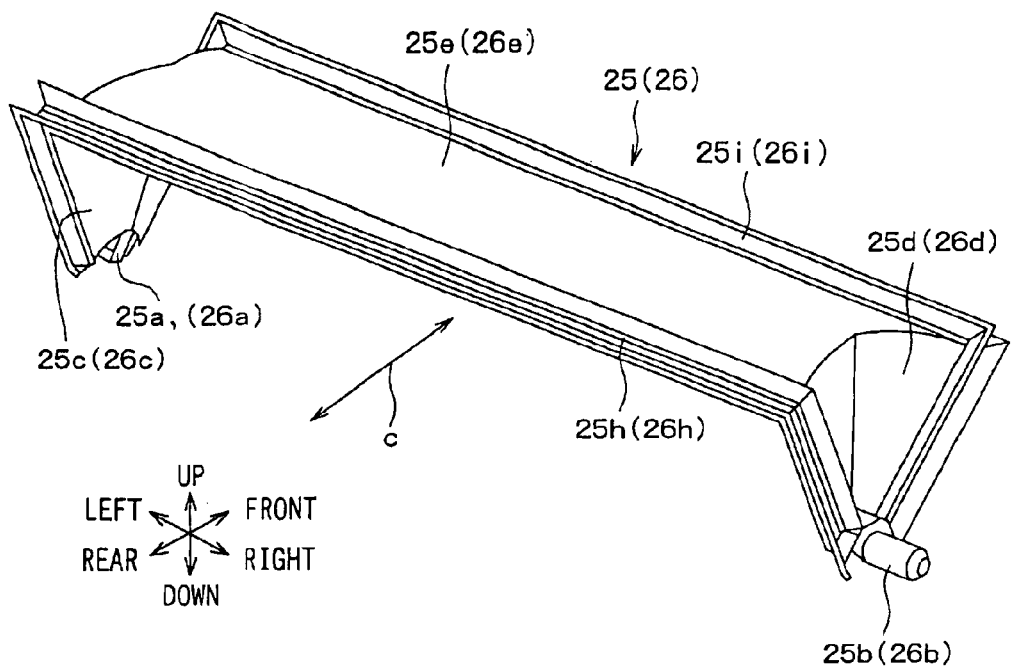
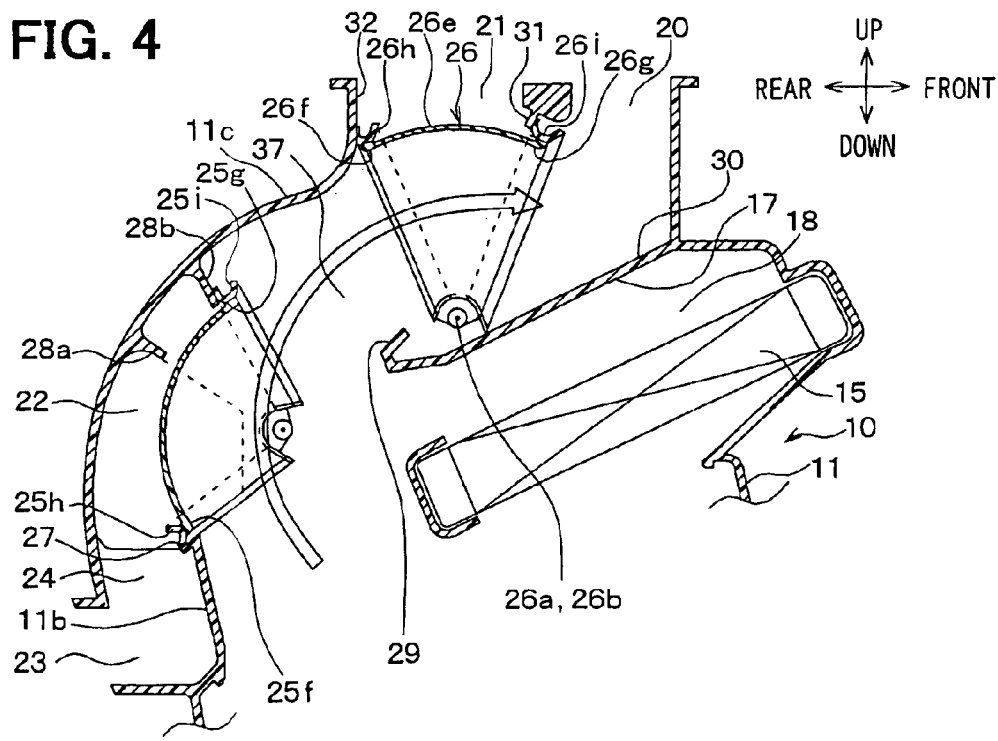

AIR PASSAGE SWITCHING DEVICE AND VEHICLE AIR CONDITIONER USING THE SAME

CROSS REFERENCE TO RELATED APPLICATION

This application is based on Japanese Patent Application No. 2003-122281 filed on Apr. 25, 2003, the disclosure of which is incorporated herein by reference.

FIELD OF THE INVENTION

The present invention relates to an air passage switching device which opens and closes an air passage by a rotary door having an outer peripheral door surface turning with a rotary shaft. The air passage switching device is suitably used for a vehicle air conditioner.

BACKGROUND OF THE INVENTION

In a conventional air-outlet mode selecting device of a vehicle air conditioner, a face opening, a defroster opening and a foot opening of an air conditioning unit are opened and closed by the use of a single rotary door having an outer peripheral door surface turning with a rotary shaft. Further, the outer peripheral door surface turning with the rotary shaft is arranged at a position separated by a predetermined distance outward in a radial direction from the center of the rotary shaft. This outer peripheral door surface is usually shaped like an arc having its center at the rotary shaft. However, in this air-outlet mode selecting device, all of the face opening, the defroster opening and the foot opening need to be arranged in an arc shape along the turning path of the outer peripheral door surface of the rotary door. On the other hand, the air conditioning unit is arranged in a place that is inside a dashboard of the vehicle and is subjected to extreme spatial constraint. Thus, it is difficult to perform the arrangement of three air outlet openings of the face opening, the defroster opening and the foot opening in the shape of an arc.

Further, in order to ensure the respective air volumes blown off from the three air outlet openings, the areas of the respective air outlet openings need to be enlarged and hence the area of the outer peripheral door surface of the rotary door needs to be enlarged. As a result, it is difficult to arrange the air outlet openings, the rotary door is increased in size, and door operating force is increased.

SUMMARY OF THE INVENTION

In view of the above-described problems, it is an object of the present invention to provide an air passage switching device which can readily set an arrangement position of each opening without increasing a door operating force.

It is another object of the present invention to provide a vehicle air conditioner using the air passage switching device.

According to the present invention, an air passage switching device includes a case having a first opening and a second opening through which air passes, and a rotary door for opening and closing the first and second openings. The rotary door includes a rotation shaft, an outer peripheral door surface separated from a center axial line of the rotation shaft to a radial outside by a predetermined dimension, and two side plates connected to the rotation shaft and end portions of the outer peripheral door surface in an axial direction of the rotation shaft. In the air passage switching device, the rotary door has first and second seal parts that are provided on periphery end portions of the side plates and the outer peripheral door surface, the first seal part is arranged at a side of the first opening, and the second seal part is arranged at a side of the second opening. Further, the rotary door has a door structure angle ($\theta d$) defined by the first and second seal parts in a rotation direction of the rotary door, and the door structure angle is larger than a door operating angle ($\theta m$) in which the rotary door is rotatable around the rotation shaft. In contrast, the case has a first end seal surface at a position proximate to the first opening and opposite to the second opening, a second end seal surface at a position proximate to the second opening and opposite to the first opening, and first and second middle seal surfaces between the first end seal surface and the second end seal surface in the rotation direction. Further, the first and second middle seal surfaces are disposed to be separated from each other in the rotation direction by a predetermined angle ($\theta t$) that is a difference between the door structure angle ($\theta d$) and the door operating angle ($\theta m$). In the air passage switching device, when the rotary door is rotated to a first operation position where the first opening is closed, the first seal part press-contacts the first end seal surface, and the second seal part press-contacts the second middle seal surface. Further, when the rotary door is rotated to a second operation position where the second opening is closed, the first seal part press-contacts the first middle seal surface, and the second seal part press-contacts the second end seal surface.

Accordingly, the rotation operation of the rotary door can be restricted by using the first and second middle seal surfaces, and the door operation angle ($\theta m$) can be set arbitrarily within the range of the door structure angle. Further, even when the door structure angle ($\theta d$) is increased in order to increase an arrangement freedom degree of the first and second end seal surfaces, the door operation angle can be prevented from being increased. As a result, arrangement positions of the first and second end seal surfaces can be readily set without increasing the door operating force.

Preferably, the case has first and second ribs protruding to an inner side of the case from an inner surface of the case, the first and second ribs are separated from each other in the rotation direction, the first rib has the first middle seal surface at a side of the first seal part of the rotary door, and the second rib has the second middle seal surface at a side of the second seal part of the rotary door. Thus, even when the ribs having the first and second middle seal surfaces are molded integrally with the case, the first and second middle seal surfaces can be accurately formed.

Alternatively, the case has a case wall between the first opening and the second opening. At this time, the case wall protrudes inside of the case to form a protrusion portion, and has a wall thickness approximately equal to a wall thickness of the other part of the case. Further, the first middle seal surface is provided on a wall surface of the protrusion portion, extending in a radius direction of the rotary door, at a side of the first opening. In contrast, the second middle seal surface is provided on a wall surface of the protrusion portion, extending in a radius direction of the rotary door, at a side of the second opening.

The air passage switching device can be suitably used for a vehicle air conditioner. When the air passage switching device is used as an air-outlet mode switching device of the vehicle air conditioner, one of the first opening and the second opening is a foot opening through which air is blown toward a lower side in the passenger compartment, and the other one of the first opening and the second opening is a communication passage opening through which an upstream side of the communication passage opening communicates with at least one of downstream openings including a face opening through which air is blown toward an upper side of the passenger compartment and a defroster opening through which air is blown toward an inner surface of a windshield of the vehicle. Alternatively, one of the first opening and the second opening is the face opening through which air is blown toward an upper side of the passenger compartment, and the other one of the first opening and the second opening is the defroster opening through which air is blown toward the inner surface of the windshield of the vehicle.

Further, when the air passage switching device can be used for an inside/outside air switching box of the vehicle air conditioner, one of the first opening and the second opening is an inside air introduction port for introducing air inside a passenger compartment of the vehicle into the case, and the other one of the first opening and the second opening is an outside air introduction port for introducing air outside the passenger compartment of the vehicle into the case.

BRIEF DESCRIPTION OF THE DRAWINGS

Other objects, features and advantages of the present invention will become more apparent from the following detailed description made with reference to the accompanying drawings, in which:

FIG. 2 is a perspective view showing a rotary door structure in the first embodiment;

FIG. 4 is a schematic cross-sectional view showing a main part in FIG. 1, in a defroster mode;

DETAILED DESCRIPTION OF THE PREFERRED EMBODIMENTS (First Embodiment)

The first embodiment of the present invention will be now described with reference to FIGS. 1–4.

Figure 1:
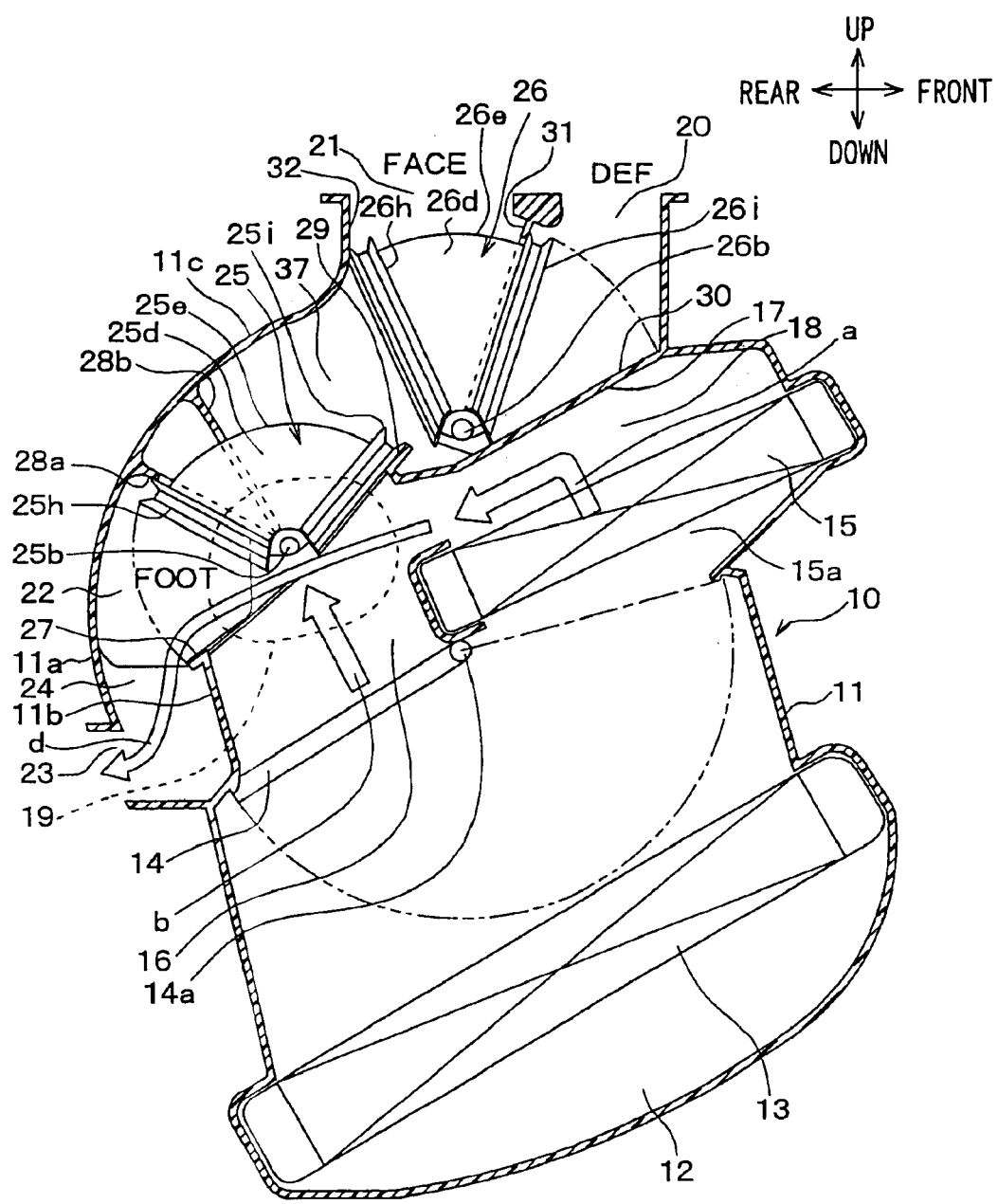
FIG. 1 is a vertical cross-sectional view of an air conditioning unit in a foot mode, in accordance with a first embodiment of the present invention.

An air conditioning unit 10 shown in FIG. 1 is arranged nearly at the center in the width direction (right-left direction) of a vehicle inside an instrument panel (i.e., dashboard) at the front in a passenger compartment. The interior unit of an air conditioner for a vehicle is broadly divided into the above-described air conditioning unit 10 arranged nearly at the center and a blower unit (not shown) arranged in a position offset to a front passenger's seat in the width direction from the center inside the instrument panel.

The blower unit has an inside/outside air switching box for selectively introducing outside air (i.e., air outside the passenger compartment) and inside air (i.e., air inside the passenger compartment), and a centrifugal blower for blowing air introduced into this inside/outside air switching box. The air blown by this blower unit flows into a lowermost air inflow space 12 in a case 11 of the air conditioning unit 10.

The case 11 is formed of resin having an elasticity and a high mechanical strength, such as polypropylene. For convenience in releasing a molded product from a mold after molding air-conditioning parts in the case, the case 11 is divided into a plurality of split cases and then the plural split cases are integrally combined into one piece.

An evaporator 13 serving as a cooling heat exchanger is arranged nearly in a horizontal direction to be inclined by a small inclined angle above the air inflow space 12 in the case 11 of the air conditioning unit 10. Thus, air blown from the blower unit flows into the air inflow space 12, and passes through the evaporator 13 upwardly from its bottom to its top. In the evaporator 13, as well known, low-pressure refrigerant reduced in pressure by a pressure reducing unit such as an expansion valve of a refrigeration cycle flows into the evaporator 13 and absorbs heat from the air, thereby being evaporated.

An air mixing door 14 and a hot water type heater core 15 serving as a heating heat exchanger are arranged above the evaporator 13 (on a downstream side of air flow). The air mixing door 14 is constructed of a cantilever plate door pivoting on a rotary shaft 14a.

The heater core 15, as well known, heats air by using hot water (i.e., engine-cooling water) of a vehicle engine as a heat source. Then, this heater core 15 is also arranged approximately in a horizontal direction, that is, approximately in parallel to the evaporator 13. The heater core 15 is smaller in a cross-sectional area than an air passage in the case 11 and is arranged nearer to the front side of the vehicle in the case 11. With this arrangement, a cold air passage 16 through which air (cold air) bypassing the heater core 15 flows is formed on the rear side of the vehicle (i.e., position nearer to a passenger seat) of the heater core 15.

The air mixing door 14 is turned in a front-rear direction of the vehicle between the evaporator 13 and the heater core 15 to open or close an inlet air passage 15a of the heater core 15 and the cold air passage 16. By using this air mixing door 14, it is possible to adjust the air volume ratio between hot air (arrow "a") passing through the inlet air passage 15a and heated by the heater core 15, and cold air (arrow "b") passing through the cold air passage 16. Therefore, the temperature of air blown into the passenger compartment can be adjusted by operation of the air mixing door 14. Thus, a temperature adjustment unit for adjusting the temperature of air blown into the passenger compartment is constructed of the air mixing door 14.

The rotary shaft 14a of the air mixing door 14 is rotatably supported by bearing holes (not shown) made in left and right side walls of the case 11. One end of the rotary shaft 14a is protruded out from the case 11 and is connected to an air mixing door operating mechanism. An actuator mechanism using a motor is typically employed as this air mixing door operating mechanism, but in place of the actuator mechanism, a manually operated mechanism can be employed.

A hot air guide wall 17 is integrally molded with the case 11 at a specified spacing above the heater core 15, and a hot air passage 18 is formed between this hot air guide wall 17 and the top surface of the heater core 15. The hot air passing through the heater core 15 is guided by the hot air guide wall 17, thereby flowing through the hot air passage 18 toward the rear side of the vehicle as shown by arrow "a".

The hot air passing through the hot air passage 18 toward a vehicle rear side and cold air passing through the cold air passage 16 upwardly as shown by arrow "b" are mixed in an air mixing portion 19 which is formed above the cold air passage 16.

A defroster opening 20 is open at a portion on the front side of the vehicle in the top surface of the case 11, and a face opening 21 is open at a portion on the rear side of the vehicle of the defroster opening 20 in the top surface of the case 11. Each of these defroster opening 20 and the face opening 21 is rectangular and, to be more specific, is shaped like a rectangle having long sides in the width direction of the vehicle and short sides in the front-rear direction of the vehicle.

The defroster opening 20 is made so as to blow off conditioned air from the air mixing portion 19 toward inside surface of the front windshield of the vehicle. Then, the face opening 21 is made so as to blow off conditioned air from the air mixing portion 19 toward the upper bodies of passengers.

Figure 3:
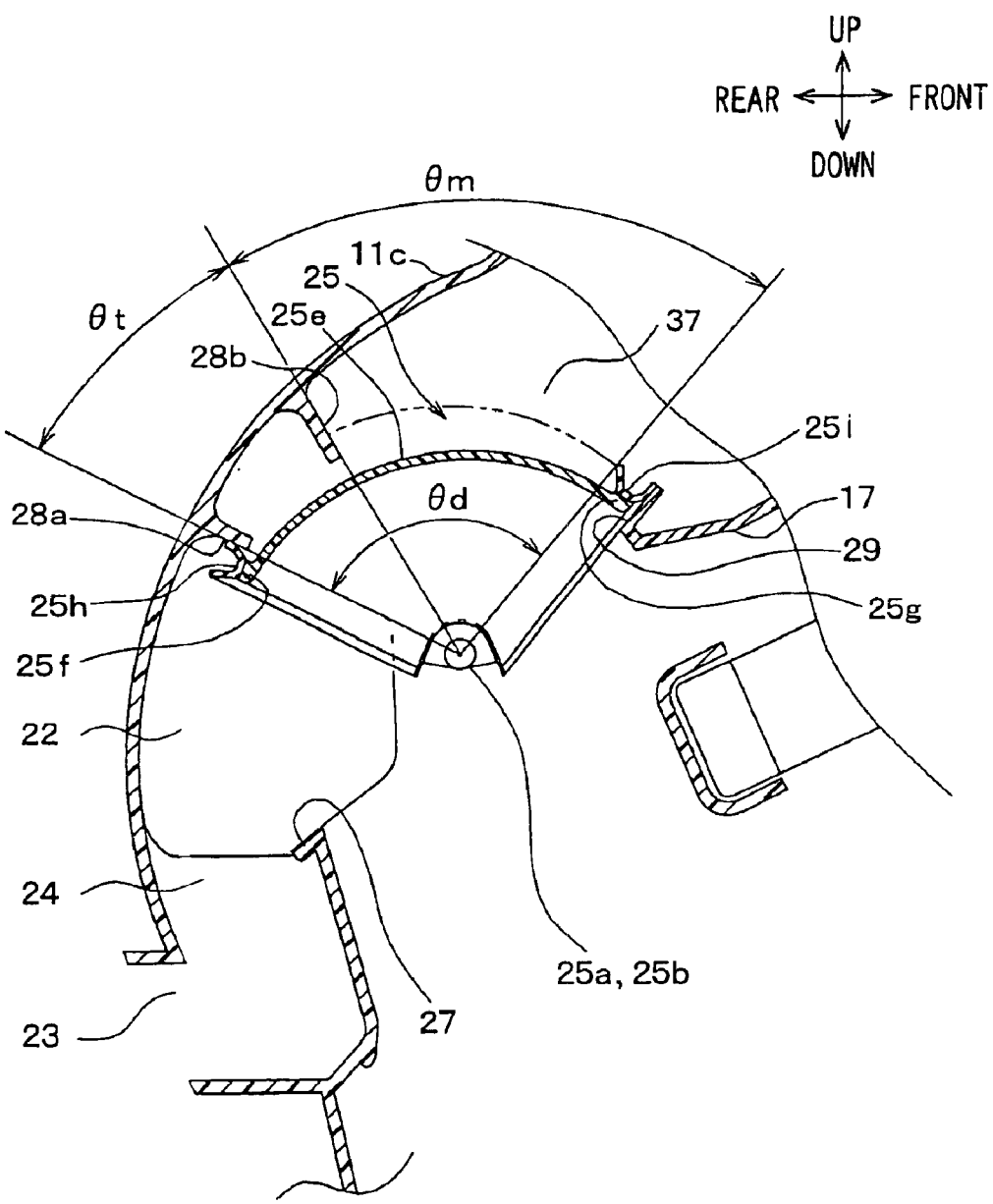
FIG. 3 is a schematic cross-sectional view showing a main part of the air conditioning unit in the foot mode of FIG. 1.

Front foot openings 22 are open at portions slightly above the air mixing portion 19 in the side walls on both the left and right sides in the width direction of the vehicle of the case 11. These front foot openings 22 on both the left and right sides are made so as to blow off conditioned air from the air mixing portion 19 toward the feet of passengers on the front seats (driver and passenger on the passenger seat). The front foot opening 22 is shaped nearly like a trapezoid that becomes narrowed toward a case inner side, as shown in FIGS. 3 and 4. Further, the front foot openings are positioned adjacent to a rear side wall surface 11a of the case 11.

A rear foot opening 23 is open in the wall surface 11a of the case 11 below the front foot openings 22 and on the rear side of the vehicle of the case 11. Here, the rear foot opening 23 is for blowing conditioned air from the air mixing portion 19 toward the foot area of a passenger on the rear seat in the passenger compartment. This rear foot opening 23 always communicates with the front foot openings 22 through a rear foot air passage 24. This rear foot air passage 24 is formed between the wall surface 11a on the rear side of the vehicle of the case 11 and a wall surface 11b for defining the cold air passage 16. The wall surface 11b is located inside the wall surface 11a on the front side of the vehicle.

In this embodiment, an air-outlet mode selecting mechanism (i.e., mode selecting device) is constructed of first and second rotary doors 25, 26. An inlet passage of the front foot openings 22 and the rear foot opening 23 is opened and closed by the first rotary door 25, and the defroster opening 20 and the face opening 21 are opened and closed by the second rotary door 26. A communication passage opening 37 is formed adjacent to the vehicle front side of the front foot openings 22. The defroster opening 20 and the face opening 21 communicate with the air mixing portion 19 through this communication passage opening 37. The first rotary door 25 opens and closes also the communication passage opening 37 when it opens and closes the foot openings 22, 23.

The first and second rotary doors 25, 26 are different from each other in outside dimension and the like but are basically equal to each other in door construction. Hence, the first rotary door 25 is used as an example, and the rotary door construction will be now described in detail with reference to FIG. 2. In FIG. 2, the reference numbers of components of the second rotary door 26 are indicated in the parenthesis at corresponding parts of the first rotary door 25. As shown in FIG. 2, the first rotary door 25 is integrally constructed of left and right rotary shafts 25a, 25b, left and right fan-shaped side plates 25c, 25d, and an outer peripheral door surface 25e.

The left and right rotary shafts 25a, 25b are formed to protrude outside of the left and right sides at the pivots of the fan-shaped left and right side plates 25c, 25d, and are rotatably supported by the bearing holes (not shown) of the left and right side walls of the case 11. Then, the outer peripheral door surface 25e is joined to outer peripheral end portions of the left and right fan-shaped side plates 25c, 25d, so that the left and right fan-shaped side plates 25c, 25d and the outer peripheral door surface 25e are formed into a gate shape (like a horseshoe or a U-shape). A space inside the gate shape is always open to a space in the case 11, so air can freely pass through the space inside the gate shape in a direction shown by the arrow "c" (in a direction perpendicular to a direction of the rotary shaft).

In the example shown in FIG. 2, each of the left and right fan-shaped side plates 25c, 25d is formed to be slightly curved inside in the direction of the rotary shaft to increase its strength. Then, the outer peripheral door surface 25e is located at a position separated by a predetermined distance in the radial direction (outward in the radial direction) of the rotary shafts 25a, 25b from the centers of the rotary shafts 25a, 25b. Further, the outer peripheral door surface 25e is extended in a rotation direction of the rotary door 25 to have a predetermined wall area.

To be more specific, the outer peripheral door surface 25e of this embodiment is shaped, in cross section, like an arc having a center at the axial line of the rotary shafts 25a, 25b, and is formed in flat shape into a rectangle having long sides in the width direction of the vehicle and short sides in the front-rear direction of the vehicle.

The first rotary door 25 including the rotary shafts 25a, 25b, the fan-shaped side plates 25c, 25d and the outer peripheral door surface 25e which have been described above is integrally molded of resin having a high mechanical strength and a set elasticity, for example, polypropylene.

Next, a seal structure in the first rotary door 25 will now described. In the first embodiment, a door seal structure is of the lip seal type so as to reduce a door operating force. First and second collar-shaped portions 25f, 25g (see FIG. 3 to be described later) are integrally molded to protrude outside on the periphery end surfaces of the outer peripheral door surface 25e and the side plates 25c, 25d that construct the door base part of the door 25. Specifically, the first collar-shaped portion 25f is provided at a side of the front foot opening 22 to protrude outside, and the second collar-shaped portion 25g is provided at a side of the communication passage opening 37 to protrude outside. Further, a first seal part 25h is fixed to the first collar-shaped portion 25f, and a second seal part 25i is fixed to the second collar-shaped portion 25g.

Both of the seal parts 25h, 25i are made of elastic material and protruded outside in the shape of lip (thin plate) from the collar-shaped portions 25f, 25g. Both of the seal parts 25h, 25i are protruded in the V-shape in cross section from the surfaces of the collar-shaped portions 25f, 25g. As shown in FIG. 2, when being viewed from a direction of an air flow inside the rotary door shown by the arrow "c", both the seal parts 25h, 25i are formed into a gate shape (like a horseshoe) as its whole shape, similarly to the whole shape of the rotary door 25.

Then, by using thermoplastic elastomer that can be molded similarly to thermoplastic resin at high temperatures whereas shows rubber elasticity at room temperature as a specific material for the seal parts 25h, 25i, both the seal parts 25h, 25i can be integrally molded and thereby fixed to the collar-shaped portions 25f, 25g while the door base part of the first rotary door 25 is molded. The rotary door 26 is formed into the shape of FIG. 2, similarly to the rotary door 25.

The first rotary door 25 is constructed as described above, to have a door structure angle θd described below. In the first embodiment, as shown in FIG. 3, the door structure angle θd of the first rotary door 25 is an angle defined by one straight line connecting a point of the second seal portion 25i for contacting a second middle seal surface 28b and the center point of the axial line of the rotation shafts 25a, 25b, and another straight line connecting a point of the first seal portion 25h for contacting a first middle seal surface 28a and the center point of the axial line of the rotation shafts 25a, 25b.

As shown in FIG. 3, a foot-opening seal surface 27 (first end seal surface) is provided integrally with the case 11 at a rear side position of the front foot opening 22 in the vehicle front-rear direction. In the first embodiment, the first rotary door 25 is rotated in the vehicle front-rear direction.

A communication-passage seal surface 29 (second end seal surface) is formed integrally with the case 11 at a front side position of the communication passage opening 37 in the vehicle front-rear direction. A bent portion bent upwardly is formed at a vehicle rear end portion of the warm air guide wall 17, and the communication-passage seal surface 29 is formed by an upper surface of the bent portion.

Further, the first middle seal surface 28a and the second middle seal surface 28b are provided between the foot-opening seal surface 27 and the communication-passage seal surface 29. More specifically, the first middle seal surface 28a is formed in a rib shape at a vehicle rear side portion from a middle portion between the foot-opening seal surface 27 and the communication-passage seal surface 29. That is, a rib having the first middle seal surface 28a protrudes from an inner surface of the case 11 to an inner side of the case 11 between the foot-opening seal surface 27 and the communication-passage seal surface 29. Further, the second middle seal surface 28b is formed in a rib shape at a vehicle front side portion from the middle portion between the foot-opening seal surface 27 and the communication-passage seal surface 29. That is, a rib having the second middle seal surface 28b protrudes from the inner surface of the case 11 to an inner side of the case 11 between the foot-opening seal surface 27 and the communication-passage seal surface 29.

The first middle seal surface 28a and the second middle seal surface 28b are arranged to form a predetermined angle θt between extension lines of the first and second middle seal surfaces 28a, 28b extending to a radial inner side. The predetermined angle θt is a difference between the door structure angle θd and a door operating angle θm. Here, the door operating angle θm is a rotation angle of the rotation shafts 25a, 25b of the first rotary door 25 from a position where the foot opening 22 (i.e., communication passage opening 37) is fully opened to a position where the foot opening 22 (i.e., communication passage opening 37) is fully closed. That is, the first rotary door 25 is rotatable within the door operating angle θm.

The four seal surfaces 27, 28a, 28b, 29 are provided so that the first and second seal portions 25h, 25i of the first rotary door 25 press-contact the four seal surfaces 27, 28a, 28b, 29 by elastically deforming.

Each of the four seal surfaces 27, 28a, 28b, 29 is shaped like a gate corresponding to the whole gate shape of each of the seal parts 25h, 25i of the first rotary door 25, so that the whole gate shape of each of the seal parts 25h, 25i of the first rotary door 25 press-contacts the four seal surfaces 27, 28a, 28b, 29.

A front side portion (outside the door) of an approximate V-shaped lip portion forming the second seal part 25i of the first rotary door 25 is pressed onto the communication-passage seal surface 29 among the seal surfaces 27, 28a, 28b, 29. Further, a front side portion (inside the door) of an approximate V-shaped lip portion forming the first seal part 25h of the first rotary door 25 is pressed onto the first middle seal surface 28a.

When the communication passage opening 37 is fully opened (defroster mode shown in FIG. 4 or face mode), a rear side portion (inside the door) of the approximate V-shaped lip portion forming the second seal part 25i of the first rotary door 25 is pressed onto the second middle seal surface 28b. Further, a rear side portion (outside the door) of the approximate V-shaped lip portion forming the first seal part 25h of the first rotary door 25 is pressed onto the foot-opening seal surface 27.

Similarly, seal surfaces 30, 31, 32 (see FIG. 1) are integrally formed with the case 11 on the front side portion of the defroster opening 20 in the front-rear direction (in the door rotation direction), on a middle portion between the defroster opening 20 and the face opening 21, and on the rear side portion of the face opening 21 in the front-rear direction (in the door rotation direction), respectively. The seal parts 26h, 26i of the second rotary door 26 are elastically deformed by and pressed onto these three seal surfaces 30, 31, 32.

Among these three seal surfaces 30, 31, 32, each of the seal surfaces 31, 32 is shaped like a gate corresponding to the whole gate shape of each of the seal parts 26h, 26i, and the whole gate-shaped portion of each of the seal parts 26h, 26i is pressed onto each of the seal surfaces 31, 32.

The middle seal surface 31 located at a middle portion between the defroster opening 20 and the face opening 21 forms seal surfaces on both of the front and rear sides in the front-rear direction of the vehicle. A lip portion of the rear side (inside the door) of an approximate V-shaped lip portion for forming the second seal part 26i of the second rotary door 26 is pressed onto the front side surface of the middle seal surface 31 as shown in FIG. 1.

Further, a lip portion of the rear side (outside the door) of an approximate V-shaped lip portion for forming the first seal part 26h of the second rotary door 26 is pressed onto the rear side seal surface 32, as shown in FIG. 1.

The remaining seal surface 30 is formed on the top surface of the hot air guide wall 17 located at the lower portion of the defroster opening 20 and hence is shaped like a simple flat plane. The whole gate shape of the seal part 26i is also pressed onto the seal surface 30.

When the face opening 21 is fully opened, the lip portion on the front side (outside the door) of the approximate V-shaped lip portion for forming the seal part 26i of the second rotary door 26 is pressed onto the seal surface 30. Further, when the face opening 21 is fully opened, the lip portion on the front side (inside the door) of the approximate V-shaped lip portion for forming the seal part 26h of the second rotary door 26 is pressed onto the rear side seal surface 32.

The first and second rotary doors 25, 26 construct an air-outlet mode selecting device for selecting an air outlet mode, and are operated in synchronization with each other by a common air-outlet mode door operating mechanism (not shown). To be more specific, any one of the rotary shafts 25a, 25b on both the left and right sides of the first rotary door 25 and any one of the rotary shafts 26a, 26b on both left and right sides of the second rotary door 26 are protruded outside any one of the left and right side walls of the case 11 and the protruded portions of these rotary shafts are connected to the common air-outlet mode door operating mechanism via a link mechanism. An actuator mechanism using a motor is typically used as this common air-outlet mode door operating mechanism. However, in place of the actuator mechanism, a manually operated mechanism can be used.

Next, the operation of the first embodiment will be described in the above-described construction of the air conditioner. FIG. 1 shows a state in a foot mode in which the first seal part 25h of the first rotary door 25 is elastically pressed onto the first middle seal surface 28a, and the second seal part 25i of the first rotary door 25 is elastically pressed onto the communication-passage seal surface 29. As a result, the communication passage opening 37 is completely closed and the inlet passage of the right and left front foot openings 22 and the rear foot opening 23 is fully opened by the first rotary door 25.

Because the defroster opening 20 and the face opening 21 are provided downstream from the communication passage opening 37, in the foot mode, air in the communication passage opening 37 does not flow into the openings 20, 21 regardless of a rotation position of the second rotary door 26. However, the second rotary door 26 is rotated to the position in FIG. 1 in accordance with the rotation displacement of the first rotary door 25. In this case, the seal parts 26h, 26i of the second rotary door 26 are elastically pressed onto the seal surfaces 32, 31 of the face opening 21, respectively. Thus, in the foot mode, the second rotary door 26 fully closes the face opening 21 and fully opens the defroster opening 20.

In the foot mode, the inner space of first rotary door 25 forms an air passage through which conditioned air from the air mixing portion 19 flows toward the front foot opening 22. Therefore, conditioned air in the air mixing portion 19 can flow into the foot openings 22, 23 through the inner space of the first rotary door 25 while flowing directly into the foot openings 22, 23.

The foot mode is mainly used for blowing warm air (hot air) toward the foot area of the passenger in a heating operation of the passenger compartment. When the air mixing door 14 is operated to the solid line position in FIG. 1 in the foot mode, a maximum heating is set so that the inlet air passage 15a of the heater core 15 is fully opened and the cool air passage 16 is fully closed. In this case, all blown air is heated in the heater core 15 to be warm air, and the warm air is blown toward the foot areas of the passengers on the front and rear seats through the front foot opening 22 and the rear foot opening 23.

Then, by turning the air mixing door 14 counterclockwise from the maximum heating state shown by solid line in FIG. 1, the cool air passage 16 is opened. For this reason, by adjusting the rotational position of the air mixing door 14, the air volume ratio between hot air heated by the heater core 15 and cold air passing through the cold air passage 16 can be adjusted, and the temperature of air blown toward the lower half body of the passenger can be adjusted to an arbitrary level.

FIG. 4 shows a state of a defroster mode in which the first rotary door 25 is turned counterclockwise by a predetermined angle from the position shown in FIG. 1. In this state, the first seal part 25h of the first rotary door 25 is elastically pressed onto the foot-opening seal surface 27, and the second seal part 25i of the first rotary door 25 is elastically pressed onto the second middle seal surface 28b. Because each of the seal surfaces 27, 28b is formed into a gate shape, each of the gate-shaped seal parts 25h, 25i entirely press-contacts each entire area of the seal surfaces 27, 28b. As a result, a communication between the inner space of the first rotary door 25 and a radial outer space outside the outer peripheral door surface 25e of the first rotary door 25 is shut. Therefore, the foot openings 22, 23 are not communicated with an upstream passage of the first rotary door 25. That is, the foot openings 22, 23 are shut from the upstream passage of the first rotary door 25.

In the defroster mode, the communication passage opening 37 is fully opened by the first rotary door 25, so that the inner space of the gate shape of the first rotary door 25 communicates with the air mixing portion 19 and the communication passage opening 37. Therefore, conditioned air from the air mixing portion 19 can flow into the communication passage opening 37 through the inner space of the first rotary door 25 while being directly introduced into the communication passage opening 37 from the air mixing portion 19.

In the defroster mode, the seal parts 26h, 26i of the second rotary door 26 elastically press-contact the seal surfaces 32, 31, respectively. Therefore, the second rotary door 26 fully opens the defroster opening 20 and fully closes the face opening 21. Thus, in the defroster mode, conditioned air from the communication passage opening 37 is only blown from the defroster opening 20 toward an inner surface of the windshield of the vehicle.

In a face mode, the first rotary door 25 is positioned at the same position as that in the defroster mode of FIG. 4. Therefore, in the face mode, the inlet passage of the front foot openings 22 and the rear foot opening 23 is fully closed, and the communication passage opening 37 is fully opened. In contrast, in the face mode, the second rotary door 26 is turned clockwise by a predetermined angle from the position in FIG. 4, so that the seal parts 26h, 26i of the second rotary door 26 are elastically pressed onto the seal surfaces 31, 30, respectively. In this case, the second rotary door 26 fully closes the defroster opening 20 and fully opens the face opening 21. Therefore, in the face mode, conditioned air from the communication passage opening 37 is blown toward the upper part of a passenger in the passenger compartment through the face opening 21.

According to the first embodiment of the present invention, the two middle seal surfaces 28a, 28b are disposed to have a predetermined distance in the rotation direction of the first rotary door 25. That is, the two middle seal surfaces 28a, 28b are separated from each other in the rotation direction of the first rotary door 25 by a predetermined angle $\theta t$ that is the difference between the door structure angle $\theta d$ and the door operating angle $\theta m$. Therefore, the door operating angle $\theta m$ can be arbitrarily determined within the door structure angle $\theta d$ of the first rotary door 25. Because the door operating angle $\theta m$ can be arbitrarily determined within the door structure angle $\theta d$ of the first rotary door 25, it is unnecessary to increase the door operating angle $\theta m$ even when the door structure angle $\theta d$ of the first rotary door 25 becomes larger in order to increase the arrangement freedom degree of the seal surfaces 27, 29. Therefore, it can prevent the door operating force from being increased due to an increase of the door operating angle θm, that is, due to an increase of a door movement distance. As a result, the seal surfaces 27, 29 can be readily arranged without increasing the door operating force (work amount). Further, it is possible to suitably change the arrangement positions of the first and second middle seal surfaces 28a, 28b, without increasing the door operating force.

Figure 8:
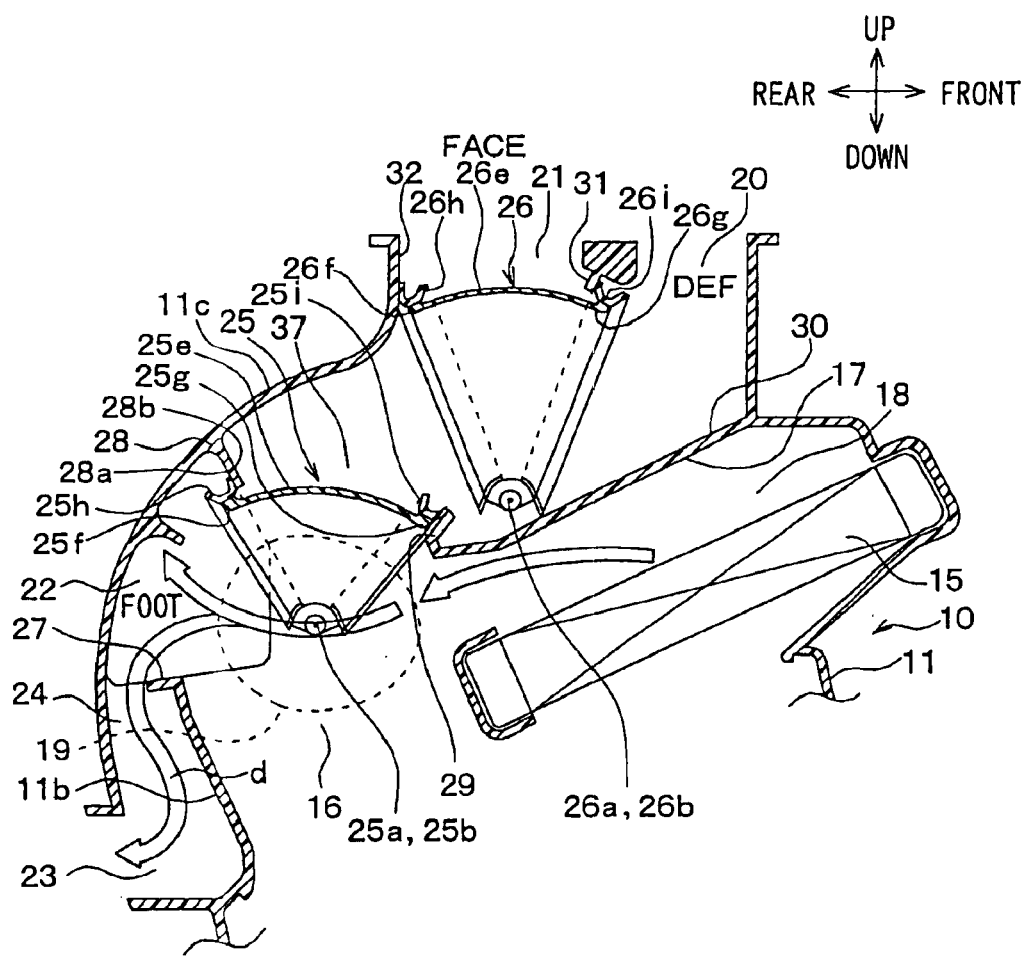
FIG. 8 is a schematic cross-sectional view of an air conditioning unit in a related art.

When the first rotary door 25 is disposed as shown in FIG. 8 and the two middle door surfaces 28a, 28b are provided on a single rib 28 that is not separated from each other, the door operating angle θm is approximately equal to the door structure angle θd. In this case, the arrangement freedom degree of the openings such as the inlet passage of the front foot openings 22 and the arrangement freedom degree of the seal surfaces 28a, 28b are restricted. Therefore, as shown in FIG. 8, air flows toward the rear foot opening 23 in a S-shape as shown by the arrow "d" in FIG. 8. In this case, a pressure loss is increased, and an air amount blown from the rear foot opening 23 is decreased. Further, the front foot openings 22 are required to be positioned at a relatively high position. Therefore, ducts for guiding air from the front foot openings 22 are required.

Figure 9:
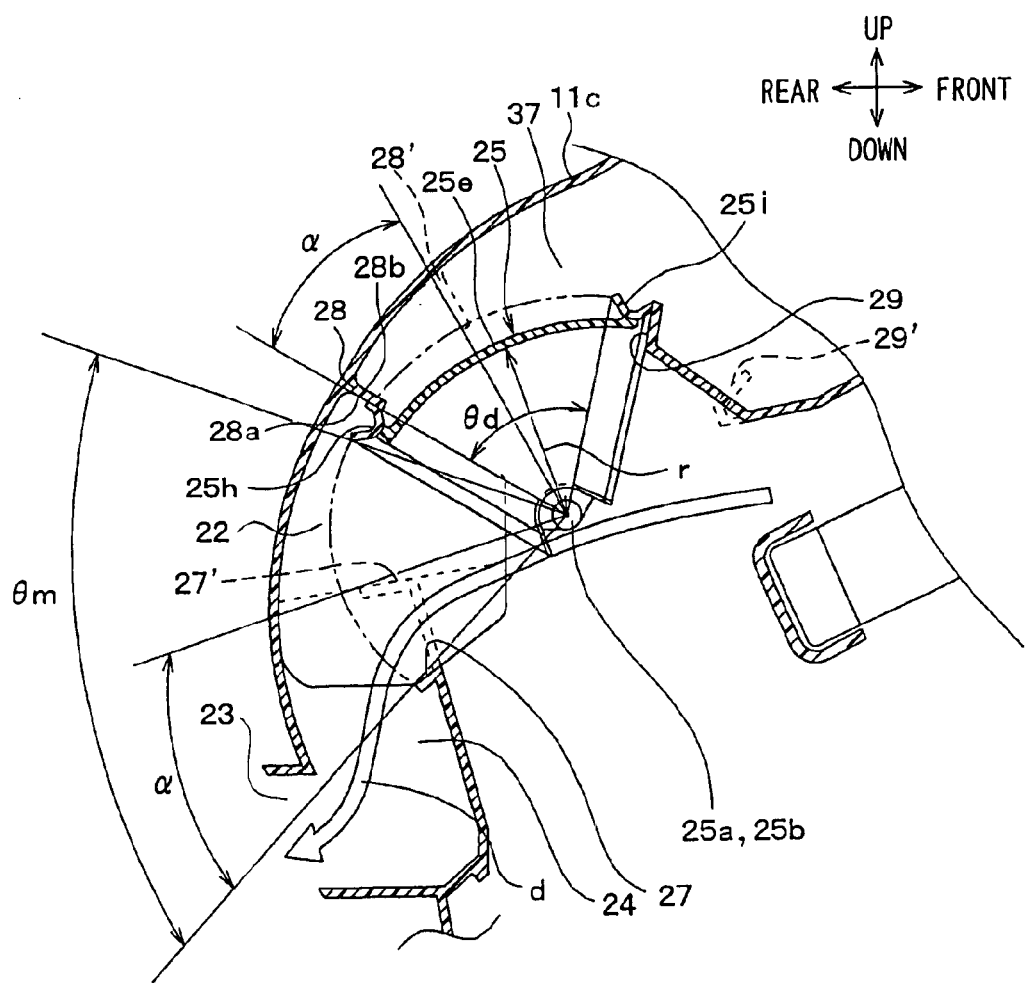
FIG. 9 is a schematic cross-sectional view of an air conditioning unit in a comparison example 1.

To overcome this problem, in a comparison example 1 studied by the inventors of the present application, as shown in FIG. 9, the foot-opening seal surface 27, the middle seal surfaces 28a, 28b and the communication-passage seal surface 29 are shifted counterclockwise toward a lower side from the positions 27', 28' and 29' by a rotation angle α around the rotation axis of the rotation shafts 25a, 25b without changing the dimensions r, θm and θd of the rotary door 25, so that air flows toward the rear foot opening 23 approximately linearly. Here, the positions 27', 28' and 29' indicate the positions of seal surfaces 27, 28, 29 in FIG. 8, respectively. However, in the comparison example 1, the communication passage opening 37 becomes near the case wall 11c, and becomes narrower. Thus, in the comparison example 1, a flow amount of air to be blown toward the defroster opening 20 or the face opening 21 may be decreased.

Figure 10:
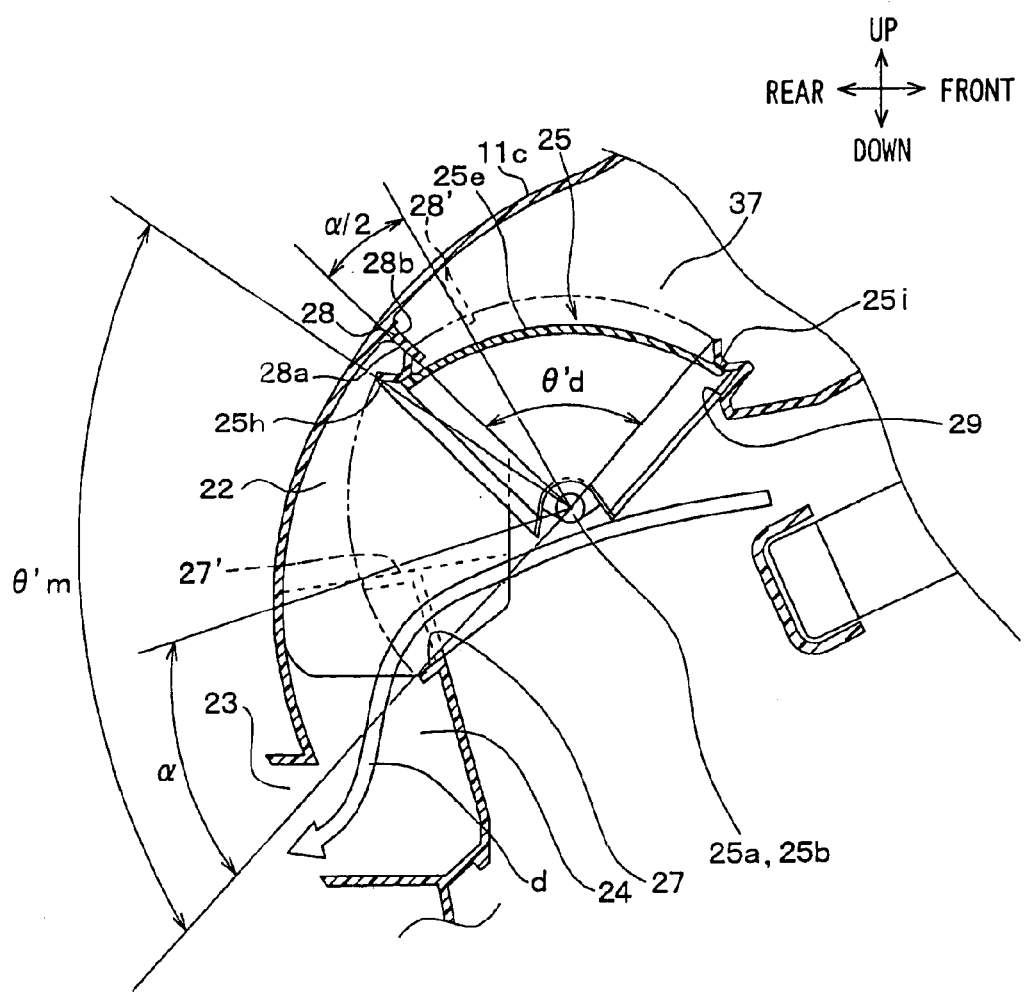
FIG. 10 is a schematic cross-sectional view of an air conditioning unit in a comparison example 2.

Further, in a comparison example 2 shown in FIG. 10, the door structure angle is set to θd' that is larger than θd of the first comparison example 1. However, in this case, the door operating angle also becomes larger from θm to θm'. If the door operating angle becomes larger, the door operation distance becomes larger, and the work amount (door operating force) becomes larger.

Figure 11:
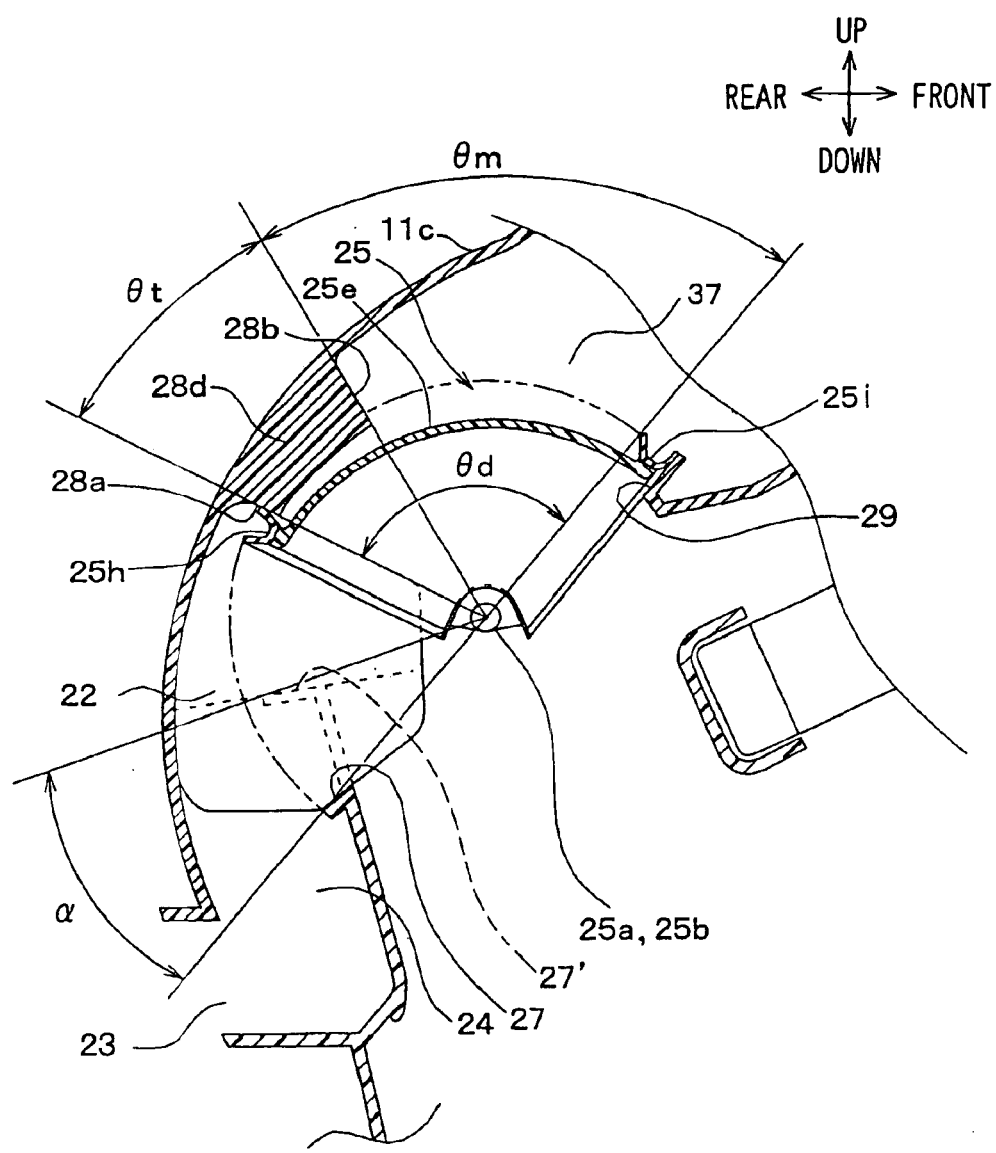
FIG. 11 is a schematic cross-sectional view of an air conditioning unit in a comparison example 3 that is a modification of the present invention.

FIG. 11 shows a comparison example 3 that is a modification of the first embodiment of the present invention. Further, in the comparison example 3 shown in FIG. 11, a protrusion portion 28d protruding to a case inner side from a case wall is provide in order to provide the two seal surfaces 28a, 28b with the angle θt. Further, a wall surface of the protrusion portion 28d, extending in the radius direction of the first rotary door 25 on the side of the front foot openings 22 is used as the first middle seal surface 28a, and a wall surface of the protrusion portion 28d, extending in the radius direction of the first rotary door 25 on the side of the communication opening 37 is used as the second middle seal surface 28b. However, in the comparison example 3, because the thickness of the protrusion portion 28d is greatly thicker than the thickness of the case 11, a problem such as a surface sink and a bending is readily caused in a resin molding, thereby it is difficult to accurately mold the seal surfaces 28a, 28b. Further, if the first and second middle surfaces 28a, 28b are not flat, air may be leaked when the seal parts 25h, 25i pressure contact the seal surfaces 28a, 28b.

Accordingly, in the first embodiment of the present invention, a firs rib having the first middle seal surface 28a and a second rib having the second middle surface are formed integrally with the case 11 to protrude to the inside of the case 11. In addition, the first rib and the second rib has a thickness that is approximately equal to the thickness of the case 11, and is separated from each other in the rotation direction of the first rotary door 25 such that the angle θt is formed between the extension lines of the first middle seal surface 28a and the second middle seal surface 28b. Here, the first middle seal surface 28a and the second middle seal surface 28b are arranged to be crossed with each other on the axis line of the rotation shafts 25a, 25b. Thus, even when the first and second ribs having the first and second middle seal surfaces 28a, 28b are molded integrally with a part of the case 11, it can prevent the seal surfaces 28a, 28b from being deformed due to the bending. As a result, in the first embodiment, the sealing performance can be improved with a simple structure.

According to the first embodiment of the present invention, because the first and second rotary doors 25, 26 are used as doors for selecting the air outlet modes, a force required to select the air outlet modes can be reduced. That is, in the first and second rotary doors 25, 26, because the outer peripheral surfaces 25e, 26e are turned around the rotary shafts 25a, 25b, 26a, 26b in a direction perpendicular to an air flow to open or close the respective openings 20, 21, 22, the outer peripheral door surfaces 25e, 26e neither need to be turned against the air flow as in a case of a cantilever plate door nor undergoes influence of the self weight of the door.

Further, the lip seal type seal parts 25h, 25i, 26h, 26i of the first and second rotary doors 25, 26 are pressed onto the case side seal surfaces 27 to 32 only when the first and second rotary doors 25, 26 are brought to the positions where the respective openings 20, 21, 22 are completely closed. While the first and second rotary doors 25, 26 are turned, the lip seal type seal parts 25h, 25i, 26h, 26i are separated from the case side seal surfaces 27 to 32, so sliding friction is not caused on the seal parts by turning the first and second rotary doors 25, 26. Thus, it is possible to effectively reduce an operating force required to select the air outlet mode as compared with an air outlet mode door using a cantilever plate door.

Still further, the first rotary door 25 is shaped like the gate by the outer peripheral door surface 25e and the side plates 25c, 25d, and the rotary shafts 25a, 25b are arranged in such a way as to protrude outside in the left and right direction. Similarly, the second rotary door 26 is shaped like the gate by the outer peripheral door surface 26e and the side plates 26c, 26d, and the rotary shafts 26a, 26b are arranged in such a way as to protrude outside in the left and right direction. Thus, the spaces inside the first and second rotary doors 25, 26 have no protruding portion preventing the air flow formed therein and hence can be used, just as they are, as passages through which air flows to the respective openings 20, 21, 22. Therefore, as compared with an air-outlet mode door using a butterfly door, the first and second rotary doors 25, 26 according to this embodiment can reduce the air flow resistance and increase the volume of air blown off from the respective openings 20, 21, 22 and reduce air blast noises (whizzing noises in the air).

According to the first and second rotary doors 25, 26 of the first embodiment of the present invention, a phenomenon in which cold air is separated from hot air is not caused. Therefore, it is possible to reduce variations in the temperature of air blown off from the respective openings 20, 21, and 22. The first rotary door 25 is formed into the gate shape constructed with the outer peripheral door surface 25e and the side plates 25c, 25d.

The first rotary door 25 opens and closes the air passage between the gate-shaped inside space and its outside space. Therefore, the opening 22 can be arranged on both of the outer peripheral side of the outer peripheral door surface 25e and the left and right sides of the side plates 25c, 25d. Similarly, the second rotary door 26 is formed into the gate shape constructed with the outer peripheral door surface 26e and the side plates 26c, 26d. The second rotary door 26 opens and closes the air passage between the gate-shaped inside space and its outside space. Therefore, the openings 20, 21 can be arranged on both of the outer peripheral side of the outer peripheral door surface 26e and the left and right sides of the side plates 26c, 26d. To be more specific, the left and right foot openings 22, 22 can be arranged on the outsides in the left and right direction of the side plates 25c, 25d of the first rotary door 25.

Thus, the upstream air passage of the first rotary door 25 can be made to communicate in line with the left and right foot openings 22, 22 to effectively reduce pressure loss caused by a bent passage to the foot openings 22, 22. Therefore, the volume of air blown off toward the feet of the passengers can be increased.

The air-outlet mode selecting device is provided with the two first and second rotary doors 25, 26. Further, the first rotary door 25 opens and closes the foot openings 22, 22 and the second rotary door 26 opens and closes the defroster opening 20 and the face opening 21. Thus, the foot openings 22, 22 can independently be formed in arbitrary positions without regard to the turning path of the outer peripheral door surface 26e of the second rotary door 26 (that is, positions where the defroster opening 20 and the face opening 21 are arranged).

In addition, the first and second rotary doors 25, 26 can be gradually reduced in size as compared with a single rotary door for opening and closing all three air outlet openings 20, 21, 22. Combined with the above-described features, it is possible to improve the mounting performance of the air conditioning unit in the vehicle.

In the above-described first embodiment, a case where the rear foot opening 23 is provided in addition to the front foot openings 22, 22 has been described. However, the present invention can be applied to a case where the rear seat side foot opening 23 is not provided but only the front seat side foot openings 22, 22 are provided.

(Second Embodiment)

The second embodiment of the present invention will be now described with reference to FIG. 5. In the above-described first embodiment, the two ribs having the thickness approximately equal to that of the case 11 are formed integrally with the case 11 to protrude inside the case 11, so that the first and second middle seal surfaces 28a, 28b are formed. However, in the second embodiment, a protrusion portion 28c having a wall thickness approximately equal to the case 11 is formed integrally with the case 11 to protrude inside the case 11, and the two middle seal surfaces 28a, 28b are formed on wall surfaces of the protrusion portion 28c. More specifically, a wall surface of the protrusion portion 28c extending in the radius direction of the first rotary door 25 on the side of the foot openings 22 is used as the first middle seal surface 28a. Further, a wall surface of the protrusion portion 28c extending in the radius direction of the first rotary door 25 on the side of the communication passage opening 37 is used as the second middle seal surface 28b.

Figure 5:
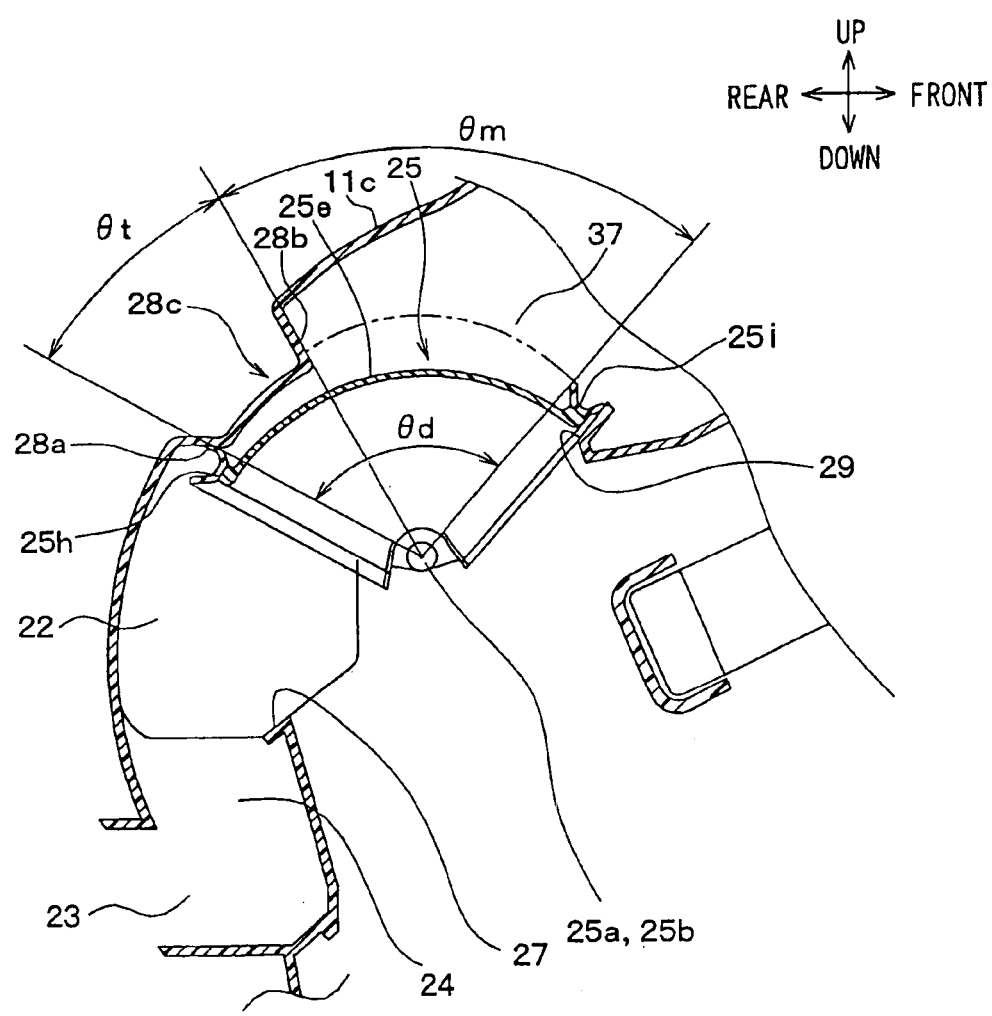
FIG. 5 is a schematic cross-sectional view showing a main part of an air conditioning unit in a foot mode, according to a second embodiment of the present invention.

As shown in FIG. 5, a part of wall of the case 11 protrudes to the inner side of the case 11 at a position between the foot opening 22 and the communication passage opening 37 while keeping substantially the same case thickness. Therefore, a recess portion recessed from an outer surface of the case 11 is formed on an outer surface of the protrusion portion 28. Because the wall thickness of the protrusion portion 28c is approximately equal to that of the case 11, the first and second middle seal surfaces 28a, 28b can be accurately formed even when the protrusion portion 28c is molded together with the case 11 by using a resin material, thereby improving sealing performance.

In the second embodiment, the other parts are similar to those of the above-described first embodiment, and the advantages described in the first embodiment can be obtained.

(Third Embodiment)

The third embodiment of the present invention will be now described with reference to FIG. 6. In the above-described first and second embodiments, the present invention is typically applied to the first rotary door 25 that opens and closes the foot openings 22 and the communication passage opening 37. However, in the third embodiment, the present invention is typically applied to the second rotary door 26 that opens and closes the defroster opening 20 and the face opening 21.

Figure 6:
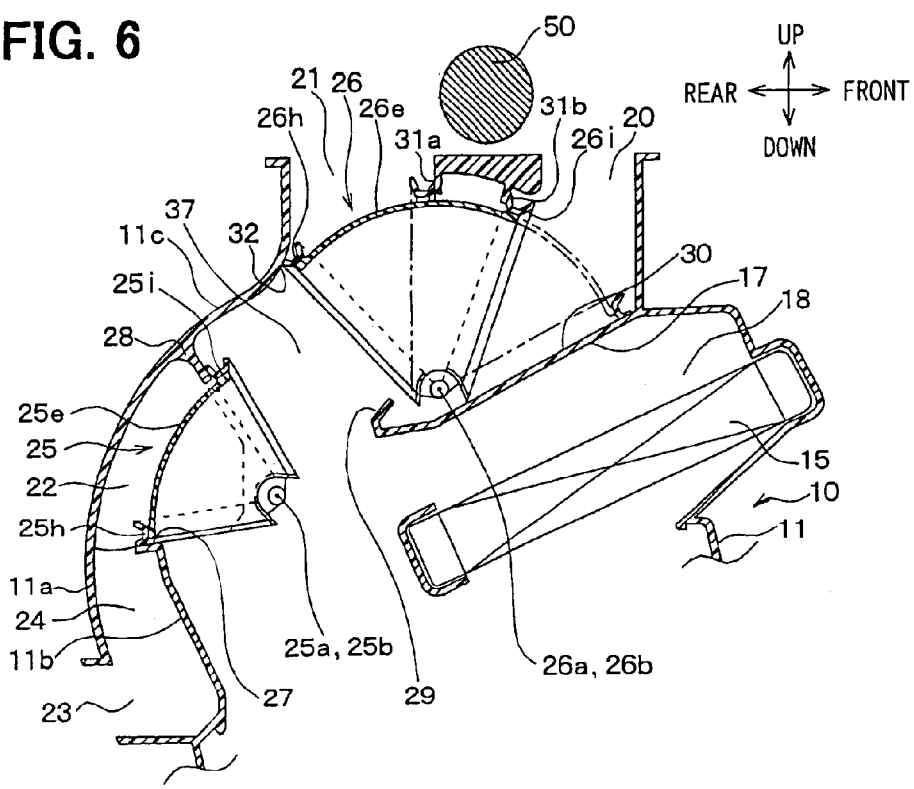
FIG. 6 is a schematic cross-sectional view showing a main part of an air conditioning unit, according to a third embodiment of the present invention.

In the third embodiment, as shown in FIG. 6, front and rear ribs having first and second middle seal surfaces 31a, 31b are formed in the case 11 to protrude inside from an inner upper surface of the case 11 at positions between the defroster opening 20 and the face opening 21. More specifically, the first middle seal surface 31a is formed on the rear side surface of the rear rib between the defroster-opening seal surface 30 and the face-opening seal surface 32. Further, the second middle seal surface 31b is formed on the front side surface of the front rib between the defroster-opening seal surface 30 and the face-opening seal surface 32.

Further, the first and second middle seal surfaces 31a, 31b are provided to be separated by the angle $\theta t$ in the rotation direction of the second rotary door 26. Here, the angle $\theta t$ is the difference between the door structure angle $\theta d$ and the door operation angle $\theta m$. More specifically, an extending line of the first middle seal surface 31a and an extending line of the second middle seal surface 31b are crossed by the angle $\theta t$ with each other at the axial line of the rotation shafts 26a, 26b. Accordingly, the arrangement positions of the defroster opening 20 and the face opening 21 can be readily set without increasing the door operation force of the second rotary door 26.

In FIG. 6, the reference number 50 indicates a vehicle component outside the air conditioning unit 10 when the air conditioning unit 10 is mounted on the vehicle. When the air conditioning unit 10 is mounted on the vehicle, if the face opening 21 is closed by the vehicle component 50, the arrangement position of the face opening 21 can be readily changed. Therefore, it can prevent an air amount blowing from the face opening 21 from being reduced by the vehicle compartment 50.

Further, because the two middle seal surfaces 31a, 31b are formed by using the ribs separated from each other in the rotation direction of the second rotary door 26, it can prevent the seal surfaces 31a, 31b from being deformed even when the seal surfaces 31a, 31b are formed by a resin molding of the case 11.

(Fourth Embodiment)

Figure 7:
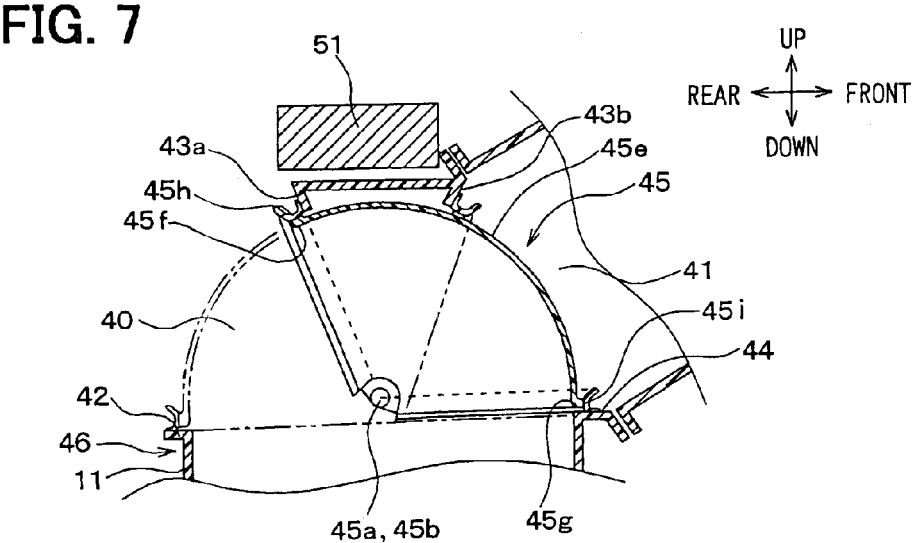
FIG. 7 is a schematic cross-sectional view showing an inside/outside air switching box of a vehicle air conditioner, according to a fourth embodiment of the present invention.

The fourth embodiment of the present invention will be now described with reference to FIG. 7. FIG. 7 shows an inside/outside air switching box 46 through which inside air (i.e., air inside the passenger compartment) and outside air (i.e., air outside the passenger compartment) can be selectively introduced into an air conditioning unit of a vehicle air conditioner.

A vehicle air conditioner includes the air conditioning unit, and a blower unit having the inside/outside air switching box 46. The air conditioning unit is disposed inside a dashboard of the vehicle at an approximate center in the vehicle width direction, and the blower unit is disposed to be offset from the air conditioning unit in the vehicle width direction. The blower unit includes a blower for blowing air introduced from the inside/outside air switching box into the air conditioning unit. The inside/outside air switching box 46 is mounted in the vehicle as shown in FIG. 7 in the vehicle front-rear direction and in the vehicle up-down direction.

The inside/outside air switching box 46 has an inside air introduction port 40 for introducing inside air, and an outside air introduction port 41 for introducing outside air. A rotary door 45 is rotatably disposed in the inside/outside air switching box 46 to open and close the inside air introduction port 40 and the outside air introduction port 41.

The inside air introduction port 40 is provided in the inside/outside air switching box 46 at a vehicle rear side position in the vehicle front-rear direction to be opened to a vehicle rear upper side. In contrast, the outside air introduction port 41 is provided in the inside/outside air switching box 46 at a vehicle front side position in the vehicle front-rear direction to be opened to a vehicle front upper side.

The rotary door 45 has a dimension that is different from that of the first and second rotary doors 25, 26, however, the rotary door 45 has a basic structure that is similar to that of the first and second rotary doors 25, 26. The rotary door 45 is integrally constructed of left and right rotary shafts 45a, 45b, left and right fan-shaped side plates, and an outer peripheral door surface 45e.

The left and right rotary shafts 45a, 45b are formed to protrude outside of the left and right sides at the pivots of the fan-shaped left and right side plates, and are rotatably supported by the bearing holes (not shown) of the left and right side walls of the inside/outside air switching box 40. Then, the outer peripheral door surface 45e is joined to outer peripheral end portions of the left and right fan-shaped side plates. Further, in the periphery end portions of the outer peripheral door surface 45e and the left and right fan-shaped side plates, a first seal part 45h is provided at a side of the inside air introduction port 40, and a second seal part 45i is provided at a side of the outside air introduction port 41. Further, the first and second middle seal surfaces 43a, 43b are provided so that the door structure angle θd is larger than the door operation angle θm.

A first end seal surface 42 is provided in the case 11 at a rear side position of the inside air introduction port 40 in the vehicle front-rear direction. Further, a second end seal surface 44 is provided in the case 11 at a front side position of the outside air introduction port 41 in the vehicle front-rear direction.

Further, a first rib having the first middle seal surface 43a on the vehicle rear side is formed between the inside air introduction port 40 and the outside air introduction port 41, to protrude inside the case 11. A middle part is provided between the inside air introduction port 40 and the outside air introduction port 41, and the first middle seal surface 43a is formed at a vehicle rear side position of the middle part in the vehicle front-rear direction. In contrast, a second rib having the second middle seal surface 43b on the vehicle front side is formed between the inside air introduction port 40 and the outside air introduction port 41, to protrude inside the case 11. Further, the second middle seal surface 43b is formed at a vehicle front side of the middle part in the vehicle front-rear direction.

The two middle seal surfaces 43a, 43b are provided to be separated from each other in a rotation direction (circumferential direction) of the rotary door 45, and to form a predetermined angle between the extension lines of the two middle seal surfaces 43a, 43b. Here, the predetermined angle is the difference between the door structure angle θd and the door operation angle θm.

FIG. 7 shows an inside air introduction mode. In the inside air introduction mode, the first seal part 45h of the rotary door 45 is elastically pressed onto the first middle seal surface 43a, and the second seal part 45i of the rotary door 45 is elastically pressed onto the second end seal surface 44. At this time, the rotary door 45 fully opens the inside air introduction port 40 and fully closes the outside air introduction port 41, so that outside air of the passenger compartment is introduced into the inside/outside air introduction box 46.

According to the fourth embodiment of the present invention, the first and second middle seal surfaces 43a, 43b are provided to be separated from each other by the predetermined angle θt that is the difference between the door structure angle θd and the door operating angle θt. Therefore, the arrangement positions of the inside air introduction port 40 and the outside air introduction port 41 can be readily set without increasing the door operation amount (work amount).

For example, when the inside air introduction port 40 is closed by a vehicle compartment 51 outside the inside/outside air switching box 46 while the inside/outside air switching box 46 is assembled to the vehicle, it is possible to change the arrangement position of the inside air introduction port 40 so that the inside air introduction port 40 is not closed by the vehicle compartment 51. As a result, it can prevent an inside air amount introduced into the inside/outside air switching box 45 from being reduced.

Further, the two middle seal surfaces 43a, 43b are formed on the first and second ribs that are separated from each other in the rotation direction and have a wall thickness approximately equal to the wall thickness of the case 11. Therefore, sealing performance can be improved even when the first and second ribs having the first and second middle seal surfaces 43a, 43b are molded integrally with the inside/outside air switching box 45.

Although the present invention has been fully described in connection with the preferred embodiments thereof with reference to the accompanying drawings, it is to be noted that various changes and modifications will become apparent to those skilled in the art.

For example, in the above-described first to third embodiments, the present invention is applied to one of the two rotary doors 25, 26. However, the present invention can be applied to both the rotary doors 25, 26, at the same time.

In the above-described first to fourth embodiments, the outer peripheral door surfaces 25e, 26e, 45e of the rotary doors 25, 26, 45 are shaped like an arc having its center at the rotary shafts 25a, 25b, 26a, 26b, 45a, 45b, respectively.

However, even if the outer peripheral door surfaces 25e, 26e, 45e are not shaped like an arc but are shaped like a flat plane, the sealing functions of the rotary doors 25, 26, 45 can be performed by the seal parts 25h, 25i, 26h, 26i, 45h, 45i. Thus, the outer peripheral door surfaces 25e, 26e, 45e can be formed into a flat shape.

Further, in the above-described first embodiment, the thermoplastic elastomer is used as the material of the seal parts 25h, 25i, 26h, 26i of the rotary doors 25, 26. Further, when the outer peripheral door surfaces 25e, 26e, the side plates 25c, 25d, 26c, 26d and the rotary shafts 25a, 25b, 26a, 26b, which construct the base part of the rotary doors 25, 26, are molded of resin, the seal parts 25h, 25i, 26h, 26i are integrally molded with them. However, it is also recommended that packing members previously molded of foaming resin or the like be used as the seal parts 25h, 25i, 26h, 26i and may be fixed to the peripheral portions of the base part of the rotary doors 25, 26 with an adhesive or the like.

Still further, the example in which the air mixing door 14 is constructed of the cantilever plate door has been described in the above-described first embodiment. However, needless to say, the air mixing door 14 can be constructed of a sliding door or a flexible film door that does not turn but moves back and forth.

Still further, in the above-described first embodiment, the example in which both the evaporator 13 and the heater core 15 are arranged nearly in the horizontal direction has been described. However, the arrangement of the evaporator 13 and the heater core 15 is not limited to the nearly horizontal arrangement but can be variously modified.

Furthermore, in the above-described first, third and fourth embodiments of the present invention, the middle seal surfaces 28a, 28b, 31a, 31b, 43a, 43b are formed by using ribs. However, it is possible to form the seal surfaces 28a, 28b, 31a, 31b, 43a, 43b by using wall surfaces of protrusion portion formed in the case 11, similarly to the second embodiment of the present invention. In addition, the protrusion portion can be formed by integrally molding of the case 11, or can be formed integrally after the protrusion portion is formed separately from the case 11. Alternatively, the protrusion portion can be formed similarly to the comparison example 3 shown in FIG. 11. In this case, preferably, the protrusion portion 28d having the two middle seal surfaces 28a, 28b is molded separately from the case 11, and then can be integrated with the case 11, in order to prevent a deformation of the middle seal surfaces 28a, 28b in the resin molding of the case 11. Further, the dimension of the protrusion portion 28d in the rotation direction is set at a suitable value that is greatly larger than the wall thickness of the case 11, so that the two middle seal surfaces 28a, 28b are separated by the predetermined angle θt in the rotation direction. Here, the predetermined angle θt is the difference between the door structure angle θd and the door rotating angle θm.

In the above-described embodiments, the present invention is applied to an air passage switching device of a vehicle air conditioner. However, the present invention can be applied to an air passage switching device for the other use.

Such changes and modifications are to be understood as being within the scope of the present invention as defined by the appended claims.

What is claimed is:

1. An air passage switching device comprising:
   a case for deforming an air passage through which air flows, the case having a first opening and a second opening through which air passes; and
   a rotary door that includes a rotation shaft, an outer peripheral door surface separated from a center axial line of the rotation shaft to a radial outside by a predetermined dimension, and two side plates connected to the rotation shaft and end portions of the outer peripheral door surface in an axial direction of the rotation shaft, wherein:
   the rotary door has first and second seal parts that are provided on periphery end portions of the side plates and the outer peripheral door surface, the first seal part being arranged at a side of the first opening, and the second seal part being arranged at a side of the second opening;
   the rotary door has a door structure angle (θd) defined by the first and second seal parts in a rotation direction of the rotary door, and the door structure angle is larger than a door operating angle (θm) in which the rotary door is rotatable around the rotation shaft;
   the case has a first end seal surface at a position proximate to the first opening and opposite to the second opening, a second end seal surface at a position proximate to the second opening and opposite to the first opening, and first and second middle seal surfaces between the first end seal surface and the second end seal surface in the rotation direction;
   the first and second middle seal surfaces are disposed to be separated from each other in the rotation direction by a predetermined angle that is a difference between the door structure angle and the door operating angle;
   when the rotary door is rotated to a first operation position where the first opening is closed, the first seal part press-contacts the first end seal surface, and the second seal part press-contacts the second middle seal surface; and
   when the rotary door is rotated to a second operation position where the second opening is closed, the first seal part press-contacts the first middle seal surface, and the second seal part press-contacts the second end seal surface.

2. The air passage switching device according to claim 1, wherein:
   the case has first and second ribs protruding to an inner side of the case from an inner surface of the case;
   the first and second ribs are separated from each other in the rotation direction;
   the first rib has the first middle seal surface at a side of the first seal part of the rotary door; and
   the second rib has the second middle seal surface at a side of the second seal part of the rotary door.

3. The air passage switching device according to claim 1, wherein:
   the case has a case wall between the first opening and the second opening;
   the case wall protrudes inside of the case to form a protrusion portion, and has a wall thickness approximately equal to a wall thickness of the other part of the case;
   the first middle seal surface is provided on a wall surface of the protrusion portion, extending in a radius direction of the rotary door, at a side of the first opening; and
   the second middle seal surface is provided on a wall surface of the protrusion portion, extending in a radius direction of the rotary door, at a side of the second opening.

4. The air passage switching device according to claim 1, wherein:
the first seal part and the second seal part are made of an elastic material, and are provided to protrude outside from outer peripheries of the outer periphery door surface and the side plates in a lip shape; and
the first seal part and the second seal part are provided to have an approximate V-shape in a cross-section.

5. A vehicle air conditioner having an air passage switching device according to claim 1 that is used for an air-outlet mode switching device, the vehicle air conditioner including a heat exchanger disposed in the case to perform heat exchange with air, wherein:
the air passage is provided so that air from the heat exchanger flows into a passenger compartment of the vehicle; and
the air-outlet mode switching device is disposed in the case downstream of the heat exchanger to change at least a flow direction of air to be blown into the passenger compartment.

6. The vehicle air conditioner according to claim 5, wherein:
one of the first opening and the second opening is a foot opening through which air is blown toward a lower side in the passenger compartment, and the other one of the first opening and the second opening is a communication passage opening through which an upstream side of the communication passage opening communicates with at least one of downstream openings including a face opening through which air is blown toward an upper side of the passenger compartment and a defroster opening through which air is blown toward an inner surface of a windshield of the vehicle.

7. The vehicle air conditioner according to claim 5, wherein:
one of the first opening and the second opening is a face opening through which air is blown toward an upper side of the passenger compartment, and the other one of the first opening and the second opening is a defroster opening through which air is blown toward an inner surface of a windshield of the vehicle.

8. A vehicle air conditioner having an air passage switching device according to claim 1 that is used for an inside/outside air switching box, wherein:
one of the first opening and the second opening is an inside air introduction port for introducing air inside a passenger compartment of the vehicle into the case, and the other one of the first opening and the second opening is an outside air introduction port for introducing air outside the passenger compartment of the vehicle into the case.

9. An air conditioner for a vehicle having a passenger compartment, the air conditioner comprising:
a case for defining an air passage through which air flows into the passenger compartment, the case having a first opening and a second opening through which air passes;
a heat exchanger disposed in the case to perform a heat exchange with air to be blown into the passenger compartment; and
a rotary door disposed in the case, the rotary door including a rotation shaft, an outer peripheral door surface separated from a center axial line of the rotation shaft to a radial outside by a predetermined dimension, and two side plates connected to the rotation shaft and end portions of the outer peripheral door surface in an axial direction of the rotation shaft, wherein:
the rotary door has first and second seal parts that are provided on periphery end portions of the side plates and the outer peripheral door surface, the first seal part being arranged at a side of the first opening, and the second seal part being arranged at a side of the second opening;
the rotary door has a door structure angle ($\theta d$) defined by the first and second seal parts in a rotation direction of the rotary door, and the door structure angle is larger than a door operating angle ($\theta m$) in which the rotary door is rotatable around the rotation shaft;
the case has a first end seal surface at a position proximate to the first opening and opposite to the second opening, a second end seal surface at a position proximate to the second opening and opposite to the first opening, and first and second middle seal surfaces between the first end seal surface and the second end seal surface in the rotation direction of the rotary door;
the first and second middle seal surfaces are disposed to be separated from each other in the rotation direction by a predetermined angle that is a difference between the door structure angle and the door operating angle;
when the rotary door is rotated to a first operation position where the first opening is closed, the first seal part press-contacts the first end seal surface, and the second seal part press-contacts the second middle seal surface; and
when the rotary door is rotated to a second operation position where the second opening is closed, the first seal part press-contacts the first middle seal surface, and the second seal part press-contacts the second end seal surface.

10. The air conditioner according to claim 9 wherein:
the first opening and the second opening are provided in the case downstream of the heat exchanger.

11. The air conditioner according to claim 10, wherein:
one of the first opening and the second opening is a foot opening through which air is blown toward a lower side in the passenger compartment, and the other one of the first opening and the second opening is a communication passage opening through which an upstream side of the communication passage communicates with at least one of downstream opening including a face opening through which air is blown toward an upper side of the passenger compartment and a defroster opening through which air is blown toward an inner surface of a windshield of the vehicle.

12. The air conditioner according to claim 10, wherein:
one of the first opening and the second opening is a face opening through which air is blown toward an upper side of the passenger compartment, and the other one of the first opening and the second opening is a defroster opening through which air is blown toward an inner surface of a windshield of the vehicle.

13. The air conditioner according to claim 9, wherein:
the first opening and the second opening are provided upstream of the heat exchanger; and
one of the first opening and the second opening is an inside air introduction port for introducing air inside a passenger compartment of the vehicle into the case, and the other one of the first opening and the second opening is an outside air introduction port for introducing air outside the passenger compartment of the vehicle into the case.

14. The air conditioner according to claim 9, wherein:

the case has first and second ribs protruding to an inner side of the case from an inner surface of the case;

the first and second ribs are separated from each other in the rotation direction;

the first rib has the first middle seal surface at a side of the first seal part of the rotary door; and the second rib has the second middle seal surface at a side of the second seal part of the rotary door.

15. The air conditioner according to claim 9, wherein:

the case has a case wall between the first opening and the second opening;

the case wall protrudes inside of the case to form a protrusion portion, and has a wall thickness approximately equal to a wall thickness of the other part of the case;

the first middle seal surface is provided on a wall surface of the protrusion portion, extending in a radius direction of the rotary door, at a side of the first opening; and the second middle seal surface is provided on a wall surface of the protrusion portion, extending in a radius direction of the rotary door, at a side of the second opening.

* * * * *